(12) United States Patent
Geyer

(10) Patent No.: US 11,333,233 B2
(45) Date of Patent: May 17, 2022

(54) ROLLER TAPPET FOR A FUEL PUMP

(71) Applicant: Schaeffler Technologies AG & Co. KG, Herzogenaurach (DE)

(72) Inventor: Norbert Geyer, Höchstadt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/291,629

(22) PCT Filed: Sep. 25, 2019

(86) PCT No.: PCT/DE2019/100842
§ 371 (c)(1),
(2) Date: May 6, 2021

(87) PCT Pub. No.: WO2020/098858
PCT Pub. Date: May 22, 2020

(65) Prior Publication Data
US 2022/0010691 A1    Jan. 13, 2022

(30) Foreign Application Priority Data
Nov. 13, 2018   (DE) .......................... 102018128384.9

(51) Int. Cl.
*F02M 59/10*    (2006.01)
*F16H 53/06*    (2006.01)

(52) U.S. Cl.
CPC ........... *F16H 53/06* (2013.01); *F02M 59/102* (2013.01)

(58) Field of Classification Search
CPC ..... F01L 1/14; F01L 2305/02; F01L 2307/00; F02M 59/102; F16H 53/06

USPC .......................................... 74/569; 123/90.48
See application file for complete search history.

(56) References Cited

U.S. PATENT DOCUMENTS

2017/0299037 A1* 10/2017 Abrahamson ........... F16H 53/06

FOREIGN PATENT DOCUMENTS

| CN | 102348894 A | 2/2012 |
|---|---|---|
| CN | 102686835 A | 9/2012 |
| DE | 102009013132 A1 | 9/2010 |
| DE | 102014218961 A1 | 3/2016 |
| DE | 102016207679 A1 | 11/2017 |
| DE | 102016207681 A1 | 11/2017 |
| DE | 102017211786 A1 | 2/2018 |
| DE | 102017107099 B3 | 6/2018 |
| DE | 102017107100 B3 | 6/2018 |
| DE | 102017109761 A1 | 11/2018 |

(Continued)

*Primary Examiner* — Jorge L Leon, Jr.
(74) *Attorney, Agent, or Firm* — Matthew Evans

(57) ABSTRACT

A roller tappet for a fuel pump is provided that has a guide housing which includes a drive-side and output-side section of the same external diameter, and a separate support body extending longitudinally through the guide housing. An upper face on the drive-side section carries a pin with a roller thereon. A lower face of the output-side section interacts at least indirectly with an arrangement for a pump piston. The drive-side section and the output-side section are axially spaced rings connected to one another via the support body. The support body has a first ring area with the upper face and a second ring area with the lower face. The first ring area is connected to an inner jacket of the drive-side section and the second ring area is connected to an inner jacket of the output-side section.

20 Claims, 2 Drawing Sheets

(56) References Cited

FOREIGN PATENT DOCUMENTS

| EP | 3002425 A1 | 4/2016 |
|----|------------|--------|
| EP | 3020932 A1 | 5/2016 |
| EP | 3173591 A1 | 5/2017 |
| JP | H11173115 A | 6/1999 |

* cited by examiner

ROLLER TAPPET FOR A FUEL PUMP

CROSS-REFERENCE TO RELATED APPLICATIONS

This application is the U.S. National Phase of PCT Application No. PCT/DE2019/100842 filed on Sep. 25, 2019, which claims priority to DE 10 2018 128 384.9 filed on Nov. 13, 2018, the entire disclosures of which are incorporated by reference herein.

TECHNICAL FIELD

This disclosure relates to a roller tappet for an internal combustion engine.

BACKGROUND

A generic roller tappet may be found in DE 10 2017 107 099 B3. The roller tappet is suitable for long installation lengths between pump cams and a following element such as a plunger. However, its complex design is disadvantageous for mass production. The elongated guide housing is in one piece and has a total of three different diameter steps in 5 segments on the outer jacket. On the one hand, the interference fit at the constriction groove of the housing can loosen. On the other hand, this interference fit can influence the high-precision guide surfaces on the outer jacket of the housing, for example in the case of an unfavorable tolerance position. Forming the guide housing by deep drawing requires unnecessary effort because of its length or proves to be almost impossible in the case of particularly long installation lengths to be bridged. Furthermore, it is found that the inner-walled support body in the guide housing is also too complicated and is also massive (extrusion).

EP 3 020 932 B1 discloses a three-part roller tappet with a solid drive-side and an annular shell-like output-side section. Both sections are coupled in the area of their fronts facing one another via a ring part as a support body (see FIG. 3).

EP 3 173 591 B1 shows a built-up roller tappet with a drive-side guide housing which is plugged together with a roller carrier, on the underside of which an adapter piece for contact with a follower element rests. The adapter piece protrudes beyond the guide housing to an extent that exceeds its height.

Furthermore, DE 10 2017 211 786 A1 discloses a roller tappet with a short design. Its guide housing has two axially successive rings joined together, of which the upper ring receives an insert piece with a pin and roller thereon.

Reference is also made to DE 10 2017 109 761 A1. This shows a roller tappet which is similar to the roller tappet from the first-mentioned DE 10 2017 107 099 B3. The guide housing here consists of two mutually joined, axially directly successive sections. In the joining area, a support body is placed over a radial plate.

DE 10 2016 207 679 A1 discloses an elongated roller tappet with a one-piece guide housing which is assembled with a multi-part support body, which at one end carries a pin with a roller on it and at the other end has a system for a follower member.

Another roller tappet for bridging long installation lengths can be found in DE 10 2017 107 100 B3.

Finally, reference is made to the "standard design" roller tappet which can be seen in DE 10 2014 218 961 A1.

SUMMARY

The object is to create a roller tappet which is particularly suitable for long installation distances and which is very simple in design and inexpensive to manufacture.

According to the disclosure, this object is achieved in that the two sections of the guide housing are separate, axially spaced rings that are connected to one another via a support body. A drive-side section does not carry a pin with a roller on it. The support body has a first ring area with an upper face and a second ring area with a lower face. The first ring area is connected to an inner jacket of the drive-side section, and the second ring area is connected to an inner jacket of the output-side section. The ring areas of the support body are connected to one another via circumferentially uniformly distributed longitudinal struts on their inner faces. The longitudinal struts lie freely for at least most of their length with respect to the two sections of the guide housing.

Thus, a roller tappet without the above-mentioned disadvantages is provided. It is clear that the tappet can also be used as a roller tappet in valve drives of internal combustion engines and/or can possibly also be present without a roller.

The roller tappet according to the disclosure consists of only very few components reduced to the essential functions. The two sections thereof can be in the form of deep-drawn sheet steel rings. These two sections can be identical, which helps reduce costs. In this case, only the output-side section in the base area has to be designed in such a way that the cross strut or the base remains for the contact of the follower element.

The support body can be produced from sheet steel by stamping and bending, its longitudinal struts being in one piece with the axially spaced ring areas.

By choosing a length of the support struts, different installation lengths can be served with a basic design of the roller tappet. The sections of the guide housing present as rings can optionally be obtained from simple roller bearing rings or from cup tappet base bodies. Under certain circumstances, the roller tappet can also have only one section.

A fixed connection of the sections of the guide housing with the ring areas of the support body can be facilitated by, for example, a welded, riveted, soldered or clipped connection. Alternatively, a press connection is possible.

The roller tappet is particularly light due to the support body, which is largely "exposed" over its length. Tilt-free guidance thus only takes place in the area of its axial end over the two annular sections.

One embodiment of the disclosure relates to the fact that at least the roller-side ring area of the support body is flattened in the circumferential sections of the longitudinal struts, with bores being applied in the flattened sections, in which a pin carrying the roller sits when the roller tappet is fully assembled. This requires two diametrically opposite longitudinal struts. The roller can undergo excellent lateral guidance on the inner surfaces of the flat areas.

It is also useful if, as proposed, the support body is bent together from a sheet steel blank after punching of its basic shape, wherein a bending center here is the imaginary axial line of the support body and roller tappet. End faces of the two ring areas of the support body can, but need not, lie against one another. If necessary, they can also be firmly connected to one another for reasons of rigidity. Here again a welded connection or the like is intended.

Of course, it is conceivable and provided that power is transmitted in the roller tappet directly via its support body (lower face, second ring area) to the follower member. However, it is considered expedient to support the support body on an inner surface of the base or the cross strut of the section on the output side and to act on the follower member via an underside of the base or the cross strut.

A simple measure for anti-rotation locking of the roller tappet in the drive-side section is also described herein. Accordingly, an anti-rotation body such as a needle or a mushroom piece or the like protrudes from an outer jacket of one of the sections. If necessary, this body can also be present as a simple shaping of the respective section.

BRIEF DESCRIPTION OF THE DRAWINGS

The disclosure is explained with reference to the drawings.

DETAILED DESCRIPTION OF THE EMBODIMENTS

Figure 1:
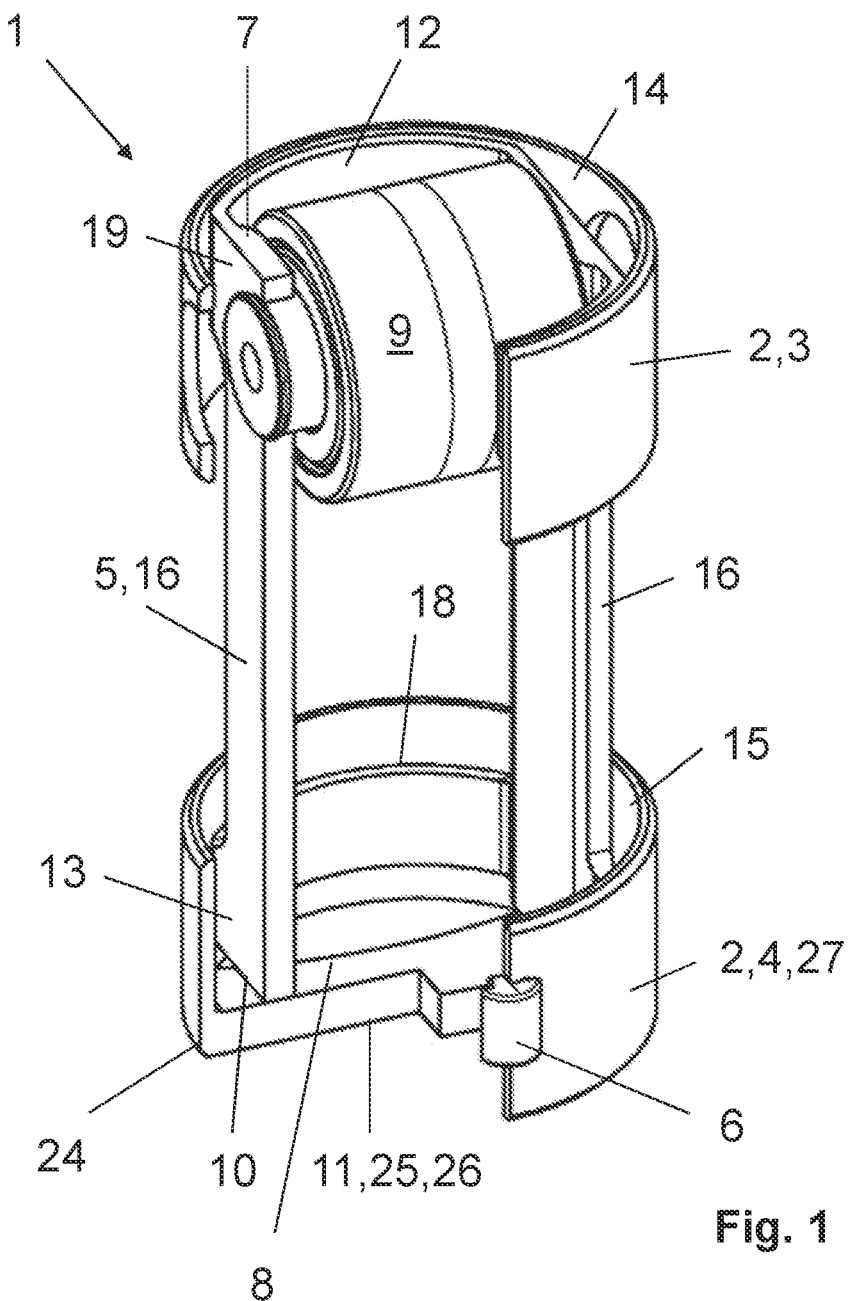
FIG. 1 shows a three-dimensional view of the roller tappet, partially broken up.

The figures show a roller tappet 1 for a fuel pump of an internal combustion engine. The roller tappet 1 is suitable for large installation spaces.

The roller tappet 1 has a guide housing 2. This consists of a drive-side and an output-side section 3, 4 of the same external diameter. Both sections 3, 4 are separate and axially spaced rings made of sheet steel. A thin-walled and separate support body 5, likewise made of sheet steel, extends longitudinally through the two-part guide housing 2. The support body 5 carries a roller 9 on its upper face 7 on the drive-side section 3. The latter sits on a pin 21 which is inserted at the end into bores 20 of the support body 5.

It can be seen that the support body 5 has a first ring area 12 with the upper face 7 and a second, axially spaced apart ring area 13 with the lower face 10. The ring areas 12, 13 are welded to the respective inner jackets 14, 15 of the sections 3, 4 and lie within their height. A one-piece connection of the ring areas 12, 13 is established via longitudinal struts 16 which extend from opposing inner faces 17, 18 of the ring areas 12, 13. As can best be seen in FIG. 1, the longitudinal struts 16 of the support body 5 are exposed over most of their length with respect to the sections 3, 4 of the guide housing 2.

The aforementioned bores 20 for the pin 21 in the first ring area 12 lie in the circumferential section of the longitudinal struts 16, which are designed as planar, indented extensions 19. In alignment with these, the upper, drive-side section 3 has two bores 28. As shown in FIG. 1, the pin 21 does not protrude into these bores 28. The pin 21 can, however, sit in the bores 28, which would additionally fix the upper section 3.

Figure 2:
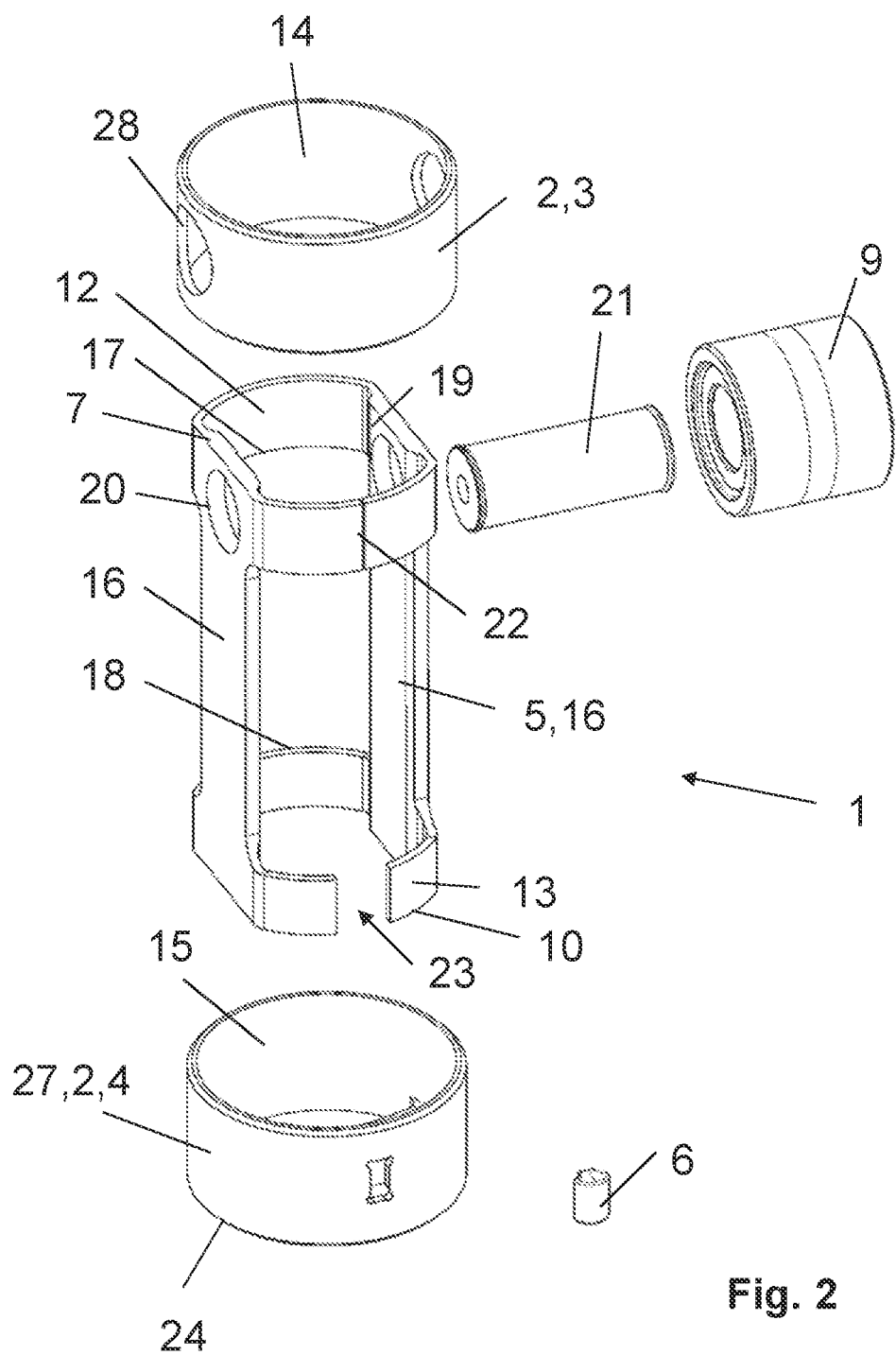
FIG. 2 shows the roller tappet in an exploded view.

From FIG. 2 it can be seen that the support body 5, after punching of its contour, is simply bent around an imaginary center in the blank, which coincides with the axial line of its ring areas 12, 13 and at the same time of the roller tappet 1. End faces 22, 23 of the ring areas 12, 13 run towards one another in the final stage of the bending process, where the end faces 22 of the first, upper ring area 12 adjoin one another.

As can also be seen from FIG. 2, the output-side section 4 of the guide housing 2 is provided in one piece with a transverse strut 25 at its output-side end 24. The areas lying on both sides of the transverse strut 25 are punched out. An arrangement 11 for a pump piston is formed on an underside 26 of the transverse strut 25. As shown, the second ring area 13 of the support body 5 rests with its lower face 10 on an inner surface 8 of the transverse strut 25.

A separate anti-rotation body 6 also protrudes from an outer jacket 27 of the lower, output-side section 4 of the guide housing 2. It has a mushroom-shaped cross-section.

LIST OF REFERENCE CHARACTERS

1 Roller
2 Guide housing
3 Drive-side section
4 Output-side section
5 Support body
6 Anti-rotation body
7 Upper face
8 Inner face
9 Roller
10 Lower face
11 Arrangement
12 First ring area
13 Second ring area
14 Inner jacket
15 Inner jacket
16 Longitudinal strut
17 Inner face
18 Inner face
19 Extension
20 Bore
21 Pin
22 End face
23 End face
24 End
25 Transverse strut
26 Underside
27 Outer jacket
28 Bore

The invention claimed is:

1. A roller tappet for an internal combustion engine, the roller tappet comprising:
   a guide housing including:
      a drive-side section having a first outer diameter, and
      an output-side section having a second outer diameter equal to the first outer diameter, the output-side section axially spaced from the drive-side section,
   a support body including:
      a first end defining first ring area configured to be fixed to the drive-side section and to receive a pin of a roller, and
      a second end defining a second ring area configured to be fixed to the output-side section and to receive a pump piston,
      wherein the first ring area is fixed to the second ring area via two longitudinal struts.

2. The roller tappet of claim 1, wherein the support body is produced in one piece from sheet steel by punching and bending.

3. The roller tappet of claim 1, wherein the first ring area is formed with two opposed flat, indented extensions respectively adjoined with the two longitudinal struts, each indented extension including a bore configured to receive the pin.

4. The roller tappet of claim 3, wherein the first ring area further comprises two opposed end faces configured to form a portion of the first ring area arranged outside of the two opposed flat, indented extensions.

5. The roller tappet of claim 4, wherein a first end face of the two opposed end faces is circumferentially offset from a second end face of the two opposed end faces.

6. The roller tappet of claim 4, wherein a first end face of the two opposed end faces engages a second end face of the two opposed end faces.

7. The roller tappet of claim 1, wherein the first ring area is configured to be fixed to a first inner jacket of the drive-side section and the second ring area is configured to be fixed to a second inner jacket of the output-side section.

8. The roller tappet of claim 1, wherein a sum of a first length of the two longitudinal struts radially covered by the drive-side section and a second length of the two longitudinal struts radially covered by the output-side section is less than an exposed length of the two longitudinal struts between the first drive-side section and the output-side section.

9. The roller tappet of claim 1, wherein the output-side section is formed with a transverse strut configured to abut against a lower axial face of the second ring area.

10. The roller tappet of claim 1, wherein at least one of the drive-side section or the output-side section is produced from sheet steel.

11. The roller tappet of claim 1, wherein the first ring area and the second ring area are respectively fixed to the drive-side section and the output-side section via welding, riveting, clipping, or press-fitting.

12. The roller tappet of claim 1, wherein:
the first ring area comprises a first bore and a second bore configured to receive the pin, and
the drive-side section comprises a third bore and a fourth bore respectively aligned with the first bore and the second bore.

13. The roller tappet of claim 1, wherein the output-side section comprises an anti-rotation body protruding from an outer jacket of the output-side section.

14. A tappet for an internal combustion engine, the tappet comprising:
a drive-side housing having a first outer diameter,
an output-side housing having a second outer diameter equal to the first outer diameter, the output-side housing axially spaced from the drive-side housing, and
a support body including:
a first ring area formed at a first end of the support body, the first ring area configured to be fixed to the drive-side housing, and
a second ring area formed at a second end of the support body, the second ring area configured to be fixed to the output-side housing,
wherein the first ring area is fixed to the second ring area via at least one longitudinal strut, and
wherein the first ring area, the second ring area, and the at least one longitudinal strut are integrally formed from one piece.

15. The tappet of claim 14, wherein the first ring area, the second ring area, and the at least one longitudinal strut are integrally formed from one piece via bending of sheet steel.

16. The tappet of claim 15, wherein the drive-side housing and the output-side housing are formed as steel rings via a drawing process.

17. The tappet of claim 16, wherein the first ring area is configured to be fixed to a first inner jacket of the drive-side housing and the second ring area is configured to be fixed to a second inner jacket of the output-side housing.

18. The tappet of claim 17, wherein the output-side housing is formed with a transverse strut configured to abut against the second end of the support body.

19. The tappet of claim 17, wherein the first ring area is formed with two opposed flat, indented extensions each including a bore which are aligned so as to receive a pin of a roller.

20. A tappet for an internal combustion engine, the tappet comprising:
a drive-side housing ring having a first outer diameter,
an output-side housing ring having a second outer diameter equal to the first outer diameter, and
a support body having:
a first ring area configured to be fixed to the drive-side housing ring, the first ring area having two flat, indented extensions configured to receive a pin of a roller, and
a second ring area configured to be fixed to the output-side housing ring, the second ring area axially spaced end from the first ring area,
wherein the first ring area is fixed to the second ring area via at least one longitudinal strut,
wherein the drive-side housing ring is axially spaced from the output-side housing ring such that a portion of the at least one longitudinal strut is exposed between the drive-side housing ring and the output-side housing ring in a longitudinal direction of the at least one longitudinal strut.

* * * * *